United States Patent
Jackson

(10) Patent No.: US 9,216,361 B2
(45) Date of Patent: Dec. 22, 2015

(54) ROBOTIC AND OTHER SKINS WITH A SUBSURFACE REINFORCEMENT LAYER AT A SELECTABLE DEPTH

(75) Inventor: Philip J. Jackson, Glendale, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 918 days.

(21) Appl. No.: 13/449,579

(22) Filed: Apr. 18, 2012

(65) Prior Publication Data

US 2013/0280493 A1  Oct. 24, 2013

(51) Int. Cl.
| | |
|---|---|
| B29C 39/10 | (2006.01) |
| A63H 9/00 | (2006.01) |
| B29C 70/54 | (2006.01) |
| B29C 70/56 | (2006.01) |
| B29C 33/12 | (2006.01) |
| B29C 45/14 | (2006.01) |
| B29K 21/00 | (2006.01) |

(52) U.S. Cl.
CPC *A63H 9/00* (2013.01); *B29C 33/12* (2013.01); *B29C 39/10* (2013.01); *B29C 70/541* (2013.01); *B29C 70/56* (2013.01); *B29C 45/14778* (2013.01); *B29C 2045/14147* (2013.01); *B29K 2021/00* (2013.01); *Y10T 428/24612* (2015.01)

(58) Field of Classification Search
CPC ........ B29C 70/06; B29C 70/10; B29C 70/22; B29C 70/224; B29C 70/40; B29C 70/42; B29C 70/46; B29C 70/48; B29C 70/541; B29C 70/543; B29C 43/18; B29C 2043/181; B29C 43/183; B29C 2043/3602; B29C 33/14
USPC ...................... 264/257, 271.1, 275
See application file for complete search history.

(56) References Cited

U.S. PATENT DOCUMENTS

| | | | |
|---|---|---|---|
| 5,266,245 A | 11/1993 | Wellings | |
| 2011/0041641 A1* | 2/2011 | Bennett | 74/490.08 |
| 2011/0087354 A1 | 4/2011 | Tye et al. | |

FOREIGN PATENT DOCUMENTS

| | | | |
|---|---|---|---|
| EP | 1226923 A1 | 7/2002 | |
| FR | 2744947 A1 | 8/1997 | |
| GB | 1252391 A | * 11/1971 | |
| JP | S5678954 A | 6/1981 | |
| WO | 9622869 A2 | 8/1996 | |

OTHER PUBLICATIONS

European Search Report for Application No. 13157702.5-1706/2653281 date Apr. 8, 2015.

* cited by examiner

*Primary Examiner* — Christina Johnson
*Assistant Examiner* — Xue Liu
(74) *Attorney, Agent, or Firm* — Marsh Fischmann & Breyfogle LLP; Kent A. Lembke

(57) ABSTRACT

A method for fabricating an artificial skin such as for use with a robotic assembly. The method includes providing a mold assembly with an exterior mold and an interior core. A cavity is defined between inner surfaces of the exterior mold and exterior surfaces of the interior core, thereby defining a shape and thickness of a skin. A surface of the interior core includes offsets or standoffs extending outward from the interior core surface. The method further includes positioning a sheet of reinforcement material over the surface such that the sheet contacts the offsets. The method includes pouring material for the skin system into the mold to occupy the cavity between the exterior mold and the interior core. The method includes disassembling the mold assembly and removing the skin with the sheet of reinforcement material embedded within the skin at an offset distance from a surface of the skin.

20 Claims, 7 Drawing Sheets

US 9,216,361 B2

ROBOTIC AND OTHER SKINS WITH A SUBSURFACE REINFORCEMENT LAYER AT A SELECTABLE DEPTH

BACKGROUND

1. Field of the Description

The present description relates, in general, to creating durable yet realistic skin for robots or for use with robotics or other applications in which skin or similar coverings are applied (e.g., robotics used to simulate movement of a human's or a character's face, hands, or the like) or used such as wet suits and the like, and, more particularly, to a skin or artificial skin system with at least one reinforcement layer or sheet of reinforcement material ("reinforcement layer") and to a method of forming a skin with a reinforcement layer.

2. Relevant Background

Durable materials that are often also flexible and elastic such as plastics and rubbers are used in many applications to create coverings or skins that are applied over an internal physical support structure or skeleton or that are worn such as wet suits for surfing, scuba diving, and other athletic or other activities. For example, artificial skins or skin systems are used to create realistic models of humans, animals, and characters, and, when combined with robotics, such skin-covered models may accurately simulate live beings.

Robotics involves the design and use of robots to provide programmable actuators or drivers to perform tasks without human intervention, and there have been significant demands for robotic devices (or robots as these terms may be used interchangeably) that simulate humans, animals, and other living beings or characters. These robotic characters are relied upon heavily in the entertainment industry to provide special effects for movies and television and to provide robots for use in shows and displays in amusement or theme parks. For example, robotics may be used to provide a character in a theme park ride or show that repeats a particular set of movements or actions (e.g., programmed tasks) based on the presence of guests or a ride vehicle or another triggering event.

It is likely that the interest in robotics will continue to expand in the coming years, and a growing area of interest is how to provide robots that appear more realistic. Many robotics companies have focused on creating robots with software, processing hardware, and mechanical actuators or drivers that allow the robots to behave more like the natural creature that is being simulated. Much work has been done to create robots that can move and even behave similar to humans such as by manipulating objects with mechanical assemblies that behave like hands configured to be human-like. Significant effort has also been directed to providing robots with realistic facial animation such as having a robot open and close its mouth to provide lip synchronization with output audio (e.g., with speech) and by providing particular facial movements including eye movement such as frowning, smiling, and the like. Similarly, much effort has been expended to provide realistically functioning arms and hands that can manipulate items and that have frequent and repeated movements and contact with surfaces and objects.

While many advances have been made in realistically simulating the physical movement and facial movement of a character, problems with maintaining a realistic or desired movement or facial animation still occur when the robotics (e.g., internal components of a robot including mechanical/structural portions as well as software, hardware, power systems, and the like) are covered with a skin or skin system, and the realism of the robotic figure or character may be furthered or hindered by the movements of the skin.

In simulating humans or human-like characters, the robotics are typically covered in a skin that is fabricated of flexible material to move naturally with the underlying robotics. The skin may be formed of a rubber material or a silicone that is attached or anchored to the mechanical actuators or drivers of the robotic system, and the skin is configured to have an outward appearance similar to the character or creature being simulated by the robot. For example, the facial skins can be formed so as to have an uncanny resemblance to the character (or person) they are imitating, but often this resemblance ends when the attached robotics begin animating the face. The skin typically is of a single material with one set of physical characteristics such as hardness, flexibility, and the like.

While these robotic skins need to be flexible, there are many applications where the skins preferably are also durable. A challenge to skin manufacturers has to be how to provide skin that is tougher and/or stronger at least in particular locations in the overall skin system without destroying the otherwise realistic movement and characteristics of the skin. For example, portions of a robotic skin may be placed under significant stresses due to repeated stretching, twisting, and other movements such as in the neck of a robot that is controlled to move the head frequently. In another example, a robot may manipulate items with its hands such that the skin may have a tendency to wear more quickly than other portions of the skin. In other skin systems, such as a wet suit, it may be useful to provide stronger or tougher skin in the elbows, knees, and other higher stress or wear areas of the skin.

Presently, skins are typically reinforced by providing a sheet of fabric reinforcement material on the inner (or outer) surface of the skin. In this manner, the reinforcement material abuts the robotics. To manufacture such a reinforced skin, a common practice is to first fabricate a mesh sock or sleeve of the stretchable reinforcement fabric. For example, the reinforcement fabric may be a mesh sheet formed of spandex (elastane) or similar elastic material. The sock or sleeve is then wrapped or stretched over a core or portion of the mold used to form the skin. This typically involves stretching the sock/sleeve as it is tightly fit to the core such that it stays firmly in contact with the surface of the core.

The skin material (such as a rubber that hardens to a desired hardness and provides a lifelike flexibility, stretchiness, and resilience) is then poured or pumped into the chamber defined between the exterior mold components and the inner core, which is covered (at least in part) by the sock/sleeve of reinforcement material. The skin material flows through the holes of the mesh sock/sleeve and against the core. After the skin solidifies, all or a portion of the exterior mold is removed to expose the reinforced skin. The skin is removed, and the reinforcement material is on or forms, or is integral to, the inner surface (or outer surface in some cases) of the skin. Hence, with existing techniques, the reinforcing material is always showing and provides the contact or mating surface when the skin is applied to a robotic device or placed in use.

SUMMARY

The inventor recognized that there are many applications where it is desirable for the reinforcing material, such as a sheet or layer of spandex or other flexible, mesh material, to be offset a distance from the surface of a skin or artificial skin system. For example, a robotic skin may be provided that is more durable by offsetting a reinforcement layer 1/16 to 3/16 inches (or more) from the surface.

In this manner, the reinforcement material is completely enclosed within the skin material (rubber or the like). Hence, the reinforcement material is bound on all sides to the skin material. Further, the reinforcement material is not exposed to the robotic elements, which may provide an improved contact and mating surface (e.g., reduce sliding on smoother reinforcement material in contrast to rubber) for attaching the skin to a robot. Further, by embedding the reinforcement material, the reinforcement layer is much less likely to be pulled out and away from the surrounding skin as is the case with a reinforcement that is only "skin deep."

The present description provides a method (and skins formed by such a method) of fabricating artificial skin systems in which a reinforcement layer is provided that is offset from the surface or embedded within the skin thickness. The offset distance or depth at which the reinforcement layer is positioned away from the skin surface (e.g., the inner surface in many cases) is selectable by the manufacturer of the skin (e.g., 1/16 to 3/16 inches or more in some cases may be useful). To this end, the core (or other portion of the mold where the reinforcement is desired) is adapted to include a plurality of offsets or standoffs that extend upward to end or terminate at a prong or mating element that either contacts or actually engages the mesh material (e.g., the mating element may either simply contact the threads/fibers of the reinforcement sheet or may extend through holes/gaps in the sheet a distance and hold/retain the sheet in place, in some cases). The shape and design of the offsets/standoffs allows the offset or embedding depth of the reinforcement material to be set for each skin system, as the inventor recognizes that a range of such depths may be useful in fabricating differing artificial skin systems. In some cases, the depth of the reinforcement layer may be varied for a single skin by varying the height of or another design parameter of the offsets/standoffs used on the core.

More particularly, a method is provided for fabricating an artificial skin such as for use with a robotic assembly. The method includes providing a mold assembly with an exterior mold and an interior core. A cavity is defined between inner surfaces of the exterior mold and exterior surfaces of the interior core, thereby defining a shape and thickness of a skin. In practice, a surface of the interior core facing the cavity includes a plurality of offsets or standoffs extending outward a distance from the interior core surface.

The method further includes positioning a sheet of reinforcement material over the surface such that the sheet is in abutting contact with at least a portion of the offsets (e.g., a subset of the offsets may contact and retain the sheet in place on the core). The method also includes pouring material for the skin system into the mold to occupy the cavity between the exterior mold and the interior core. Then, after the material has hardened to form the skin system, the method includes disassembling the mold assembly and removing the skin with the sheet of reinforcement material embedded within the skin at an offset distance from a surface of the skin.

In some cases, the reinforcement material includes a mesh fabric formed from or of an elastic material. For example, the elastic material may be spandex provided as a sleeve or sock for stretching and then placing over the core with its offsets. In the method, the offsets retain the sheet of reinforcement material at the offset distance, and the offset distance may be at least about 1/16 inches from the surface of the skin. The shape of the offsets may vary, and, in some cases, each of the offsets has a body with a conical, frustoconical, or hemispherical shape. It may be desirable in some applications for each of the bodies to further include at least one retention member for coupling with threads of the sheet of reinforcement material. For example, the retention member is provided at a distance from a tip of the body of the offset and is made up of a recessed surface extending about the body of the offset adapted for receiving one or more of the threads of the sheet of the reinforcement material. In some embodiments, the method includes removing the skin system from the mold assembly and applying the skin system over a robotic assembly.

DETAILED DESCRIPTION OF THE PREFERRED EMBODIMENTS

Briefly, the following description is directed toward skin systems or, more simply, skins such as a unitary exterior skin layer for application over a robotic device (e.g., a robotic head, robotic-based hands and arms, and so on) and to methods of fabricating such skins or skin systems. It was recognized that there is a need for providing reinforcement layers (e.g., mesh or porous sheets of elastic materials such as spandex) that are offset a distance from the exterior surface of the skin. For example, the skin may be used to cover robotics that contact and move the skin and move in a repetitive manner, and it may be useful to provide more durable, lighter skin where the reinforcement material is embedded so that it does not contact the drive elements of the robotics.

Briefly, such skins are fabricated by using a core (or a housing/casing in some cases) with one or more exterior surfaces with a pattern of offsets/standoffs extending upward from the surface. These standoffs/offsets receive a sheet of reinforcement material that is typically stretched over the core (e.g., a sock, glove, or sleeve of spandex or the like stretched over all or a portion of the core), and the core that is covered with the reinforcement material is enclosed in a casing/housing of the mold assembly. The cavity between the exterior surface of the core and the inner surfaces of the casing is then filled with a volume of liquid rubber or other skin-forming material, which is then allowed to cure or harden. The mold assembly is then opened, and the skin with the embedded or offset reinforcement layer can be removed and applied to a robotics device or otherwise placed into use (such as if the skin is a wet suit or other product).

Figure 1:
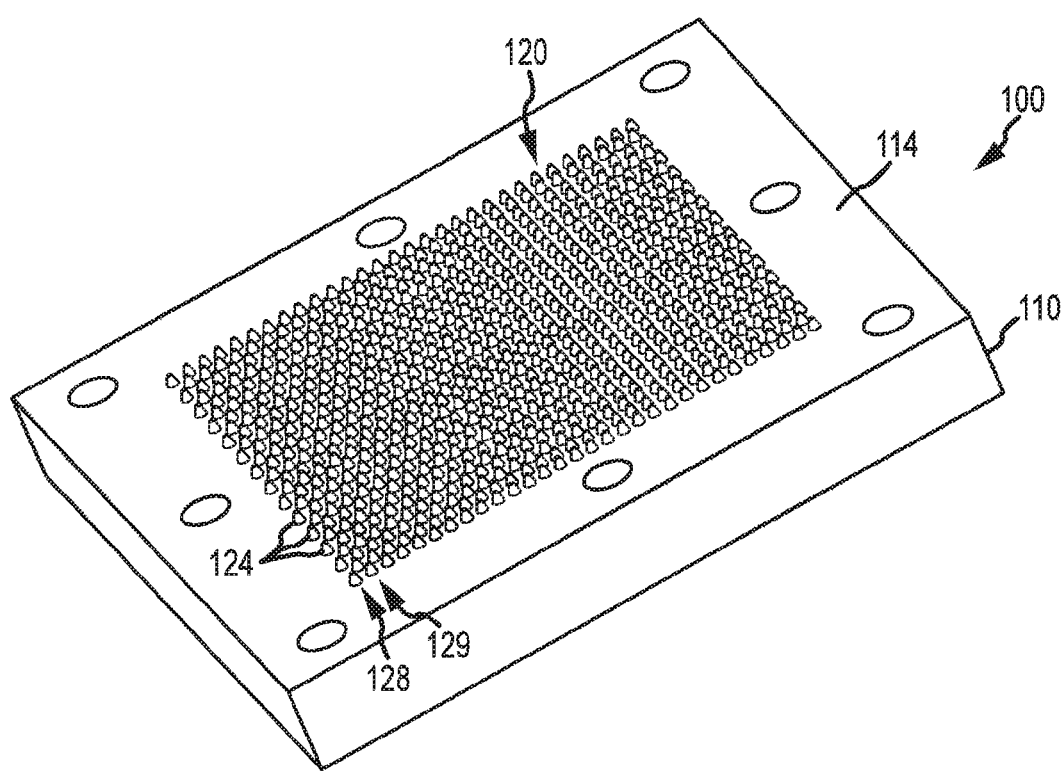
FIG. 1 illustrates a core or core section of a mold assembly for use in forming a skin or skin system, with the core having a surface that would help define a cavity (and, therefore, the formed skin) and that has a pattern of reinforcement standoffs or offsets.

FIG. 1 illustrates a core or core portion 100 for use in a mold assembly (not shown in FIG. 1) in forming a skin or artificial skin system with a pour of flexible, compressible, and resilient material such as rubber or a compound useful in forming life-like skins. As discussed, such a skin preferably can be formed with a reinforcement material layer that is offset some distance from an inner or back surface of the skin (e.g., the reinforcement material layer is embedded within the skin).

To this end, the core 100 includes a body or wall 110 with an exterior surface 114 (e.g., a surface facing into the mold assembly to define a cavity for receiving the liquid skin-forming material such as rubber). On the exterior surface or core surface 114, a pattern or plurality 120 of offsets or standoffs 124 are provided. Generally, the offsets/standoffs 124 are bodies of nearly any shape that extend upward some distance (an offset distance) from the surface 114.

The offsets/standoffs 124 function to receive and contact a sheet or layer of reinforcement material when the core 100 is assembled within a mold assembly prior to a pour of liquid over the core 100. As shown, the standoffs 124 are cones or conical in shape and are provided at a relatively high density, which is typically acceptable since the skin liquid often is pumped under pressure into the cavity such that it readily flows through even small gaps and fills all spaces in the cavity (including flowing through the pores/holes in the reinforcement sheet, not shown as applied to the core 100 over standoffs 124). The pattern 120 is shown to include side-by-side rows 128, 129 of the standoffs 124 that may be parallel in both directions or may be staggered as shown.

Figure 2:
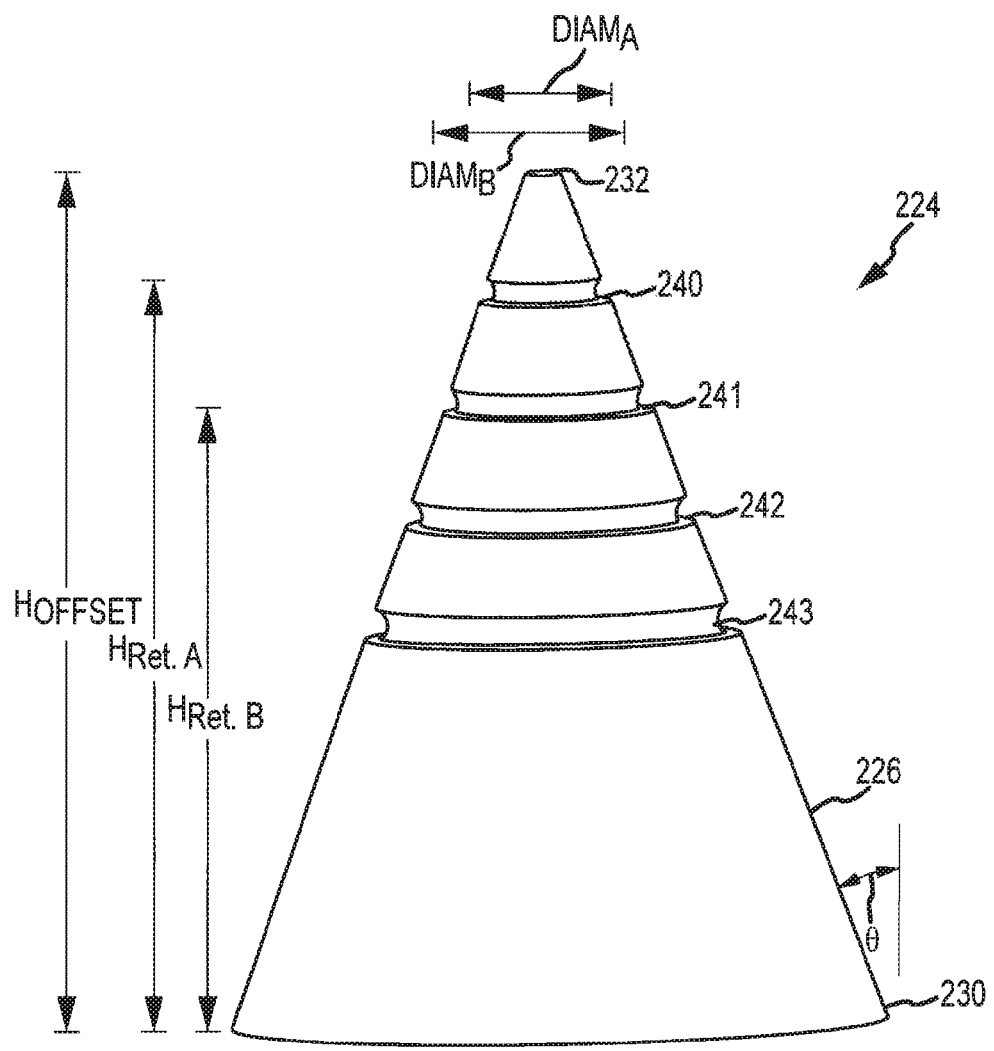
FIG. 2 is side view of an exemplary conical standoff/offset that can be used in a mold assembly such as on a core surface (or, in some cases, on a casing/outer housing when the reinforcement material is offset from an outer surface)

FIG. 2 illustrates an exemplary standoff 224 that may be used as one or more of the standoffs 124 of core 100. As shown, the standoff 224 has a body 226 that is conical shaped as it may be useful to use cones as they provide less "print through" on the front of a skin than some other shapes (e.g., stretch a skin and less likely to see the dimples or "holes" created by standoffs on back/inner surface of skin through the front surface). The conical body 226 extends upward from a base 230 to a tip 232 such as at an angle, θ, that may range from about 3 to 20 degrees or the like. The standoff 224 has a height, $H_{Offset}$, that defines a maximum offset depth for a reinforcement material because, in use, the reinforcement material would be stretched over a core with a plurality of standoffs 224 and caused to at least abut or contact the tip 232 (e.g., in abutting contact with the standoff 224 at tip 232 in a mold assembly cavity). Typically, the height, $H_{offset}$, will be in at least 1/16 inches with some implementations using a range of 1/16 to 3/16 inches for the standoff height, $H_{Offset}$.

More typically, though, the reinforcement material is relatively porous such as a sheet of spandex or other elastic material (e.g., four-way stretchable fabric or the like). Hence, when the material is stretched its holes/gaps are larger than the diameter of the tip 232, and the reinforcement material will slide over the tip/end 232 onto the body 226 of the conical standoff 224 some distance. As a result, the actual standoff or offset distance will often be some amount less than the height, $H_{offset}$, and such engagement can be limited or controlled by selecting the angle, θ, and/or selecting the weave or porosity of the reinforcement material.

Further, there may be some applications where it is desirable to retain the reinforcement material on the standoff 224 or to cause physical engagement between the standoff 224 and the reinforcement material/sheet. For example, it may be useful for a worker assembling a mold assembly to be able to feel or even hear when the reinforcement material engages the standoffs 224 (e.g., pop or snap the sheet of spandex onto the standoffs or the like).

The standoff 224 of FIG. 2 includes a series of retention elements 240, 241, 242, 243 in the form of ring-shaped recesses at preset distances from the tip 232. Each has a larger diameter (as shown with rings/retainers 240, 241 and diameters $DIAM_A \leq DIAM_B$) than the prior and more distal retention element (increase in diameter as approach core surface and each defines a different offset distance (as shown with $H_{RetA} > H_{RetB}$). In use, a stretched sheet of spandex or other elastic material with a porous weave (or with holes/openings) is placed over a portion of a core that includes or has a plurality of standoffs 224. The tip 232 will extend through a hole in the sheet of reinforcement material. Depending on the size of the hole and other factors (such as how much force is used to press the sheet onto the standoff), the reinforcement sheet will snap onto or engage with one of the retainer rings/retention elements 240-243, which will set the offset depth at that location of the core (e.g., $H_{RetA}$, $H_{RetB}$, or a smaller offset distance).

Figure 3:
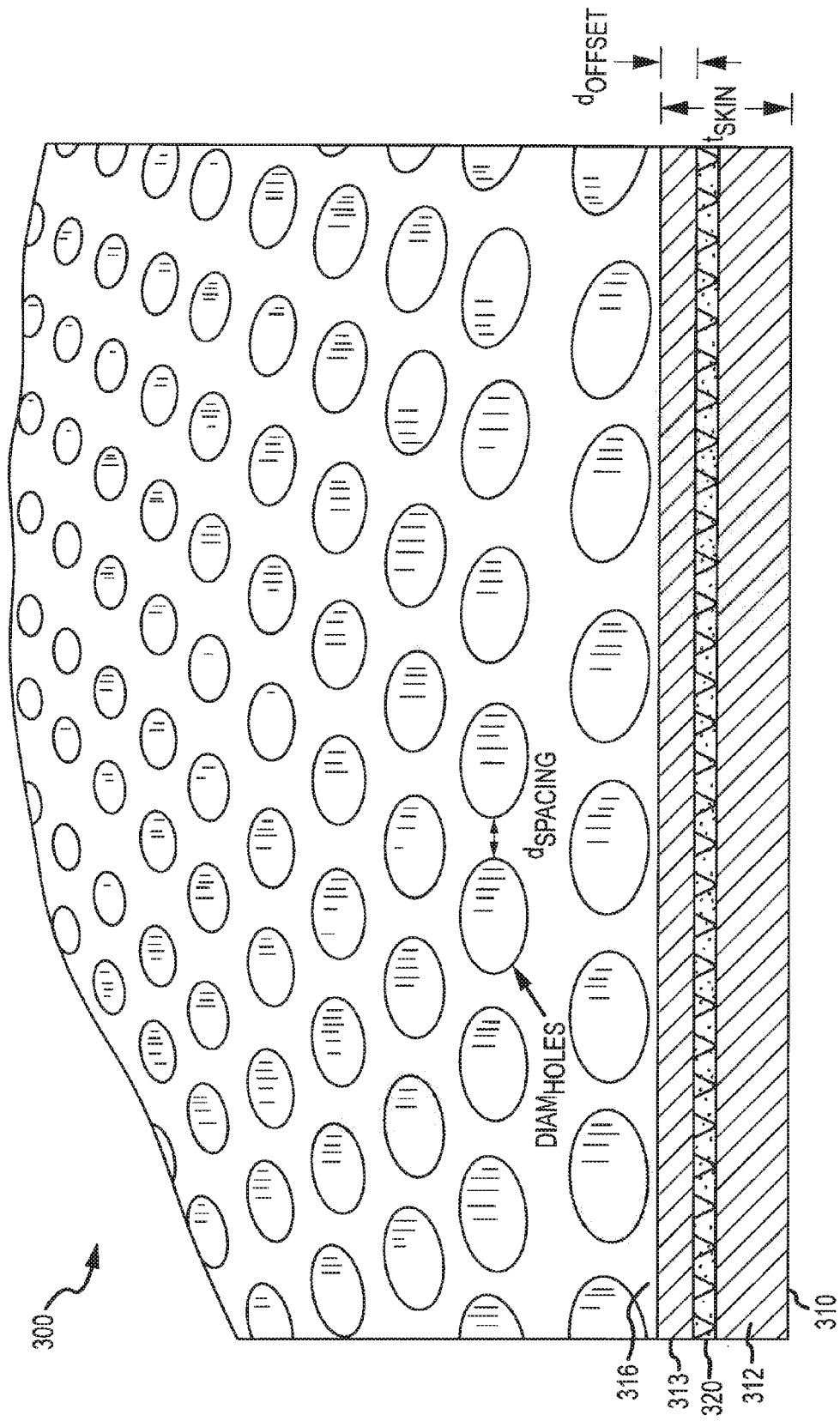
FIG. 3 is a partial, sectional view of a skin or skin system that may be formed with a core (or casing) of the present description with a pattern of offsets/standoffs to embed or offset a reinforcement sheet or layer of reinforcement material a distance from a skin surface, which has a dimpled or contoured surface due to the presence of the standoffs/offsets.

FIG. 3 illustrates a skin or skin system 300 that may be formed using the core 100 with the standoffs 124 in the conical form shown in FIG. 2. As shown, the skin 300 has a first surface 310 (typically, an exterior or outward facing surface when the skin 300 is applied to a robotic device, worn by a person, or the like). The skin 300 has a first or exterior portion 312 made up, typically, of a homogenous thickness of the rubber or other skin material. The skin 300 further has a second or interior portion 313 that includes the honeycombed pattern shown in a second or interior surface 316, which would be formed by the standoffs of a core (such as the cones shown in FIG. 3). Note, the standoffs/offsets may be of a large enough height such that the holes in surface 316 extend through both layers/portions 313 and 312 such that the skin is porous (e.g., with the holes on surface 310 being the same or, more typically, smaller size than on surface 316). This may be useful to provide a breathable skin 300 such as may be worn by a person, e.g., a costume, a wet or other suit, and the like.

The layers or portions 312, 313 may also be provided in two or more pours such as in cases where it is desired to have these two layers/portions 312, 313 to be formed of differing materials and/or to have two differing hardnesses (or other physical/chemical characteristics). For example, layer/portion 313 may be poured first and bond with or hold the reinforcement fabric/sheet 320. The layer or portion may be formed of material that is harder or otherwise more durable (e.g., a durometer reading of 10 or higher on the Shore A scale or the like). The skin 300 may then be removed from the original mold and a second pour with a different material and outer casing used to form the layer/portion 312. In this way, the layer or portion 312 could be harder or softer (e.g., a durometer reading on the Shore 00 scale or other reading/range lower than the layer/portion 312), with a softer outer layer being useful in some robotics applications to provide a more lifelike outer skin layer and a more durable inner/contact layer.

At the surface 316, each hole or recess provided by a standoff has a diameter, $Diam_{Hole}$, and are spaced apart a distance, $d_{Spacing}$, as defined by the configuration and arrangement of the standoffs on the core used to form the skin 300. These dimensions or skin parameters may be varied to practice the invention with larger diameter holes/recesses making the skin lighter in weight, more easily flexed, and the like but potentially less durable and with spacing typically being a fraction of to several millimeters also depending upon the size and depth the of the holes/recesses and desired qualities of the skin 300.

Significantly, the skin 300 further includes a sheet or layer 320 of reinforcement material (a mesh patch or sleeve of flexible material such as spandex or the like). The reinforcement sheet 320 is sandwiched between the exterior and interior portions 312, 313 of the skin 300. The skin 300 has a thickness, $t_{Skin}$, such as 2 to 10 millimeters or the like (0.1 to 0.5 inches or the like), and the depth, $d_{Offset}$, of the sheet 320 in the skin 300 is controlled or set by the design of the standoffs of the core (not shown in FIG. 3 but may be of the form shown in FIGS. 1 and 2). Often, the depth, $d_{Offset}$, will be in the range of 1/16 to 3/16 inches.

In some embodiments, more than one depth, $d_{Offset}$, is provided such as by varying the heights of the standoffs/offsets on a core. In this manner, the sheet 320 may be placed at two or more depths, $d_{Offset}$, within a skin 300 to provide a multi-depth reinforcement of the skin. For example, it may be useful to have the reinforcement 320 closer to the surface 316 in some portions of the skin 300 (e.g., at or nearer to 1/16 inches) but further away in other portions (e.g., at or nearer to 3/16 inches) to provide a desired movement or action of the skin in portions of the skin 300 and/or to increase durability in particularly high wear areas of the skin 300.

Again, a unique aspect of the skin 300 is that the depth, $d_{Offset}$, for the sheet 320 may be chosen by a skin fabricator and then accurately controlled during a skin fabrication/pouring by attaching a sleeve or sheet 320 upon a core with standoffs. The combined use of a mesh material for the sheet 320 (such as spandex) and the standoffs allows the rubber or other skin material to flow in and amongst the openings in the sheet 320 and the standoffs such that the sheet 320 of reinforcement material is integrally formed in the skin 300 (mated to both portions 312, 313) such that it is less likely to pull out during use (repeated flexing of the skin 300 with sheet 320) to increase durability and strength of the skin 300.

As will be appreciated, the standoffs on a core provide the function of contacting an applied sheet or sleeve of reinforcement material and holding or retaining the material a relatively consistent or uniform distance from the surface of the core (which surface defines a surface (e.g., the exterior surface) of a skin). To this end, the standoffs may take many forms including differing shapes and sizes and may be selected to suit the particular reinforcement material or to obtain a desired hole size/shape in a surface of the skin (the interior surface of a skin that will abut/contact robotics or other drivers).

Figure 4:
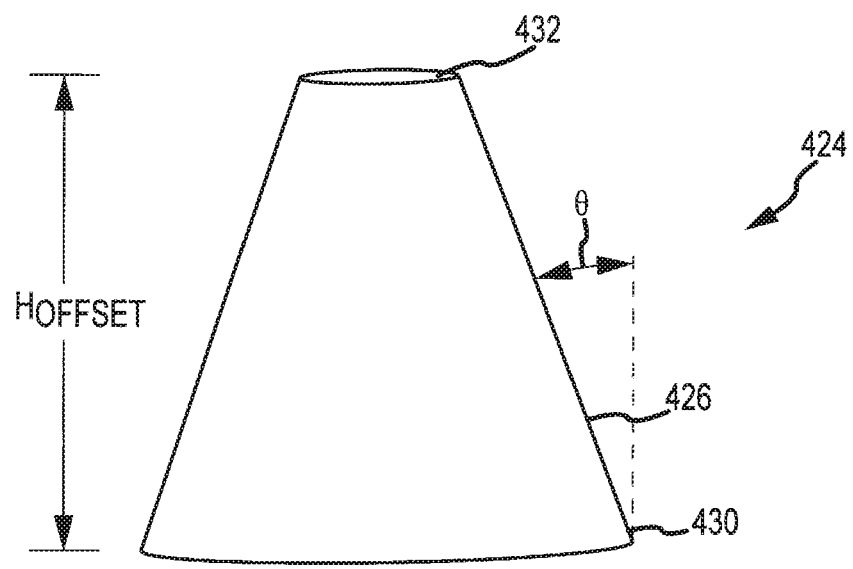
FIG. 4 is a side view, similar to FIG. 2, showing another exemplary standoff/offset configuration in which frustoconical shapes are used to offset a reinforcing material (e.g., frustoconical standoffs rather than (or in addition to) conical standoffs)

For example, FIG. 4 illustrates another exemplary standoff or offset 424 that may be provided on a core surface. As shown, the standoff 424 has a body 426 that is frustoconical in shape as defined by incline angle, θ (3 to 30 degrees or the like). The body 426 may contact a received reinforcement sheet/sleeve at a tip 432 or at some point along the body 426 between the tip 432 and the base 430 (near the core surface), e.g., depending on the diameter of the tip 432 and body 430 and size of mesh/openings (if any) in the reinforcement sheet/sleeve. The body 430 has a height, $H_{Offset}$, that is selected (based on where the sheet is likely to contact the standoff/offset 424) to define an offset distance for the reinforcement material in a skin formed with a core with a pattern of the offsets 424.

Figure 5:
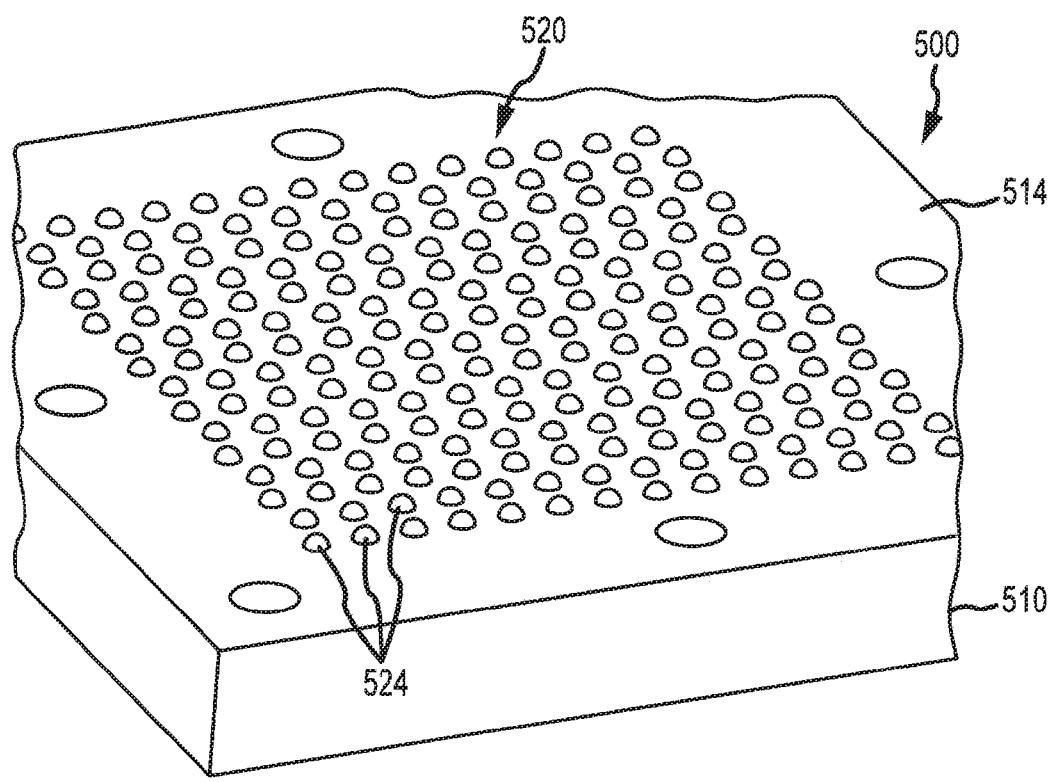
FIG. 5 illustrates, similar to FIG. 1, another embodiment of a core or core section for use in mold assemblies in producing skins or skin systems with embedded reinforcement layers or sheets, with core having a pattern of hemispherical-shaped standoffs/offsets.

As another example of differing and useful core and standoff configurations, FIG. 5 illustrates a core (or core segment) 500 with a body 510 with an exterior surface 514 that is used to define a texture and shape of a surface of skin formed with the core 500 (e.g., defines the interior surface of a skin used on robotic devices or the like). The core surface 514 includes a pattern or plurality 520 of standoffs or offsets 524. Instead of conical or frustoconical bodies, the standoffs 524 are hemispherical in shape, and the pattern of recesses/holes in the skin formed with core 500 would be similar to that found on a golf ball. The pattern of standoffs 524 may be regular (side-by-side or offset rows) or irregular as shown in FIG. 5 with an almost random arrangement of the offsets 524.

The radius of the spheres used to define the standoffs 524 may be varied to practice the core 500 and are used to define the offset distance of a sheet or sleeve of reinforcement material applied to the core 500 and its surface 514. Again, the size of the standoffs and the size and arrangement of the weave/openings in the mesh reinforcement sheet will determine whether the sheet is received on the tip of the standoffs 524 and/or whether the threads/wires defining the reinforcement sheet/sleeve extend around the body of the standoff (contact between the base and tip of the standoff to define the offset distance for the reinforcement in the later formed skin).

Figure 7:
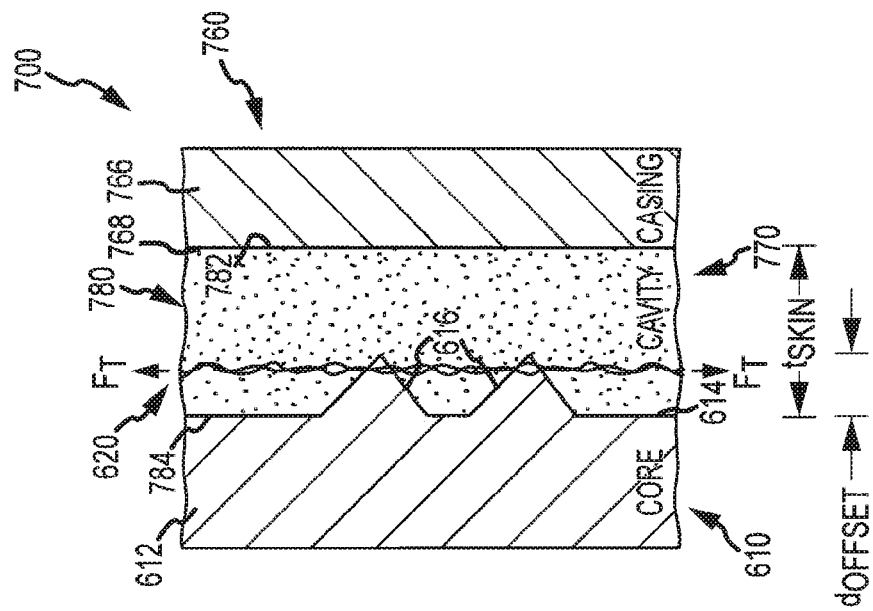
FIGS. 6 and 7 illustrates a partial sectional view of a mold assembly during its use to fabricate a skin with an embedded reinforcement layer, with FIG. 6 showing application of a stretched reinforcement sheet being pressed onto a number of conical offsets and FIG. 7 showing the mold assembly after a casing/housing has been used to define a cavity and after pumping a volume of fill (liquid rubber or similar material) into the mold that, upon curing, forms the skin system.
Figure 6:
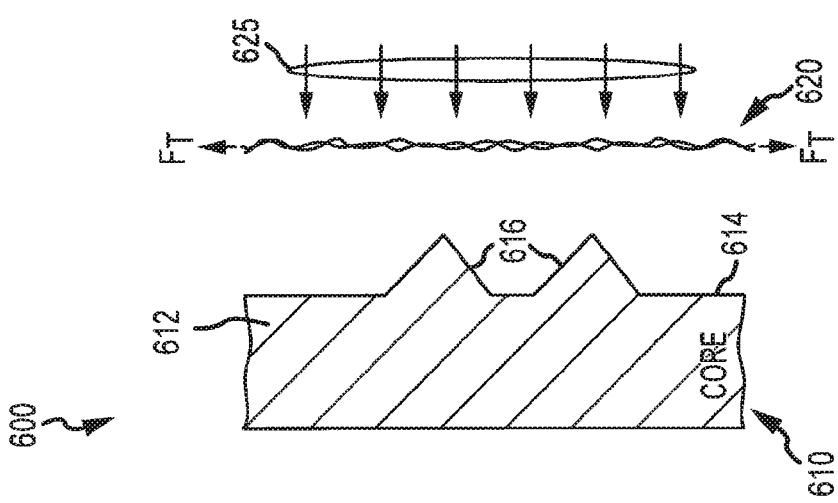

FIGS. 6 and 7 illustrate use of a core with a pattern of offsets/standoffs to selectively place a reinforcement within a skin that is molded using the core. FIG. 6 shows a mold or mold assembly 600 in initial steps of forming a skin or skin system. As shown, the assembly 600 includes a core 610 with a body 612 and an exterior surface (cavity-facing surface) 614. Upon the surface 614, a plurality or pattern of offsets or standoffs 616 is provided, and, in this example, each standoff 616 is conical in shape and extends outward a distance/height from the core surface 614.

In use of the mold assembly 600, a reinforcement 620, such as a sheet or sleeve of a 4-way stretch mesh fabric, is stretched (as shown with tensile force arrows, FT) and pressed or pushed into contact with the standoffs 616 (as shown with arrows 625). The stretching, $F_T$, may be used to enlarge the openings/holes in the mesh reinforcement 620 and/or to initially stretch the fabric of sheet 620 such that when released elastic characteristics of the material of the sheet/sleeve 620 cause it to be retained in place on core 610 and in contact with standoffs 616. For example, the core 610 may be used to form a skin for fitting over an arm or hand of a robotic device, and the reinforcement 620 may be provided in the shape of a sleeve or glove that is "at rest" too small to fit over the core but will fit when stretched by forces, FT (which causes the mesh/openings to enlarge).

FIG. 7 shows the mold assembly 700 with the reinforcement 620 in place on the standoffs 616, with the tips of the standoffs 616 extending a distance through the mesh reinforcement 620. A casing or outer housing 760 is positioned about or to enclose the core 610. The casing 760 has a body 766 with an inner surface 768 facing the core 610, and the core surface 614 with the standoffs 616 and the casing surface 768 define a cavity 770 in the mold assembly 700 for receiving a pour of a volume of liquid (liquid rubber or the like) used to form a skin 780. The reinforcement 620 is retained in the cavity 770 at an offset distance, $d_{Offset}$, within the overall thickness, $t_{Skin}$, of the skin 780 by the offsets 616.

The skin 780 has a first surface (e.g., outer surface) 782 defined by the casing surface 768 and a second surface (e.g., inner surface) 784 defined by the core surface 614 and offsets 616 (e.g., is textured with recesses/holes corresponding to the offsets 616). Further, once allowed to harden, the skin 780 can be removed from the mold 700 and will have an embedded reinforcement 620 at the offset distance, $d_{Offset}$, defined by the offsets 616. As a result, the skin 780 is more durable as the reinforcement 620 is less likely to pull out of the skin 780 in use, and the skin 780 may be more useful in applications where it is undesirable for the reinforcement material to be exposed (e.g., rubber or other material of the skin 780 provide contact surfaces on surface 784 and roughness provided by texturing may also assist in providing an improved contact surface). Still further, the skin 780 may provide a shock absorbing functionality with the recesses/holes formed by the offsets 616 and may be more readily compressed/stretched at locations of the holes/recesses (e.g., due to less stiction and material to compress/stretch).

Figure 8:
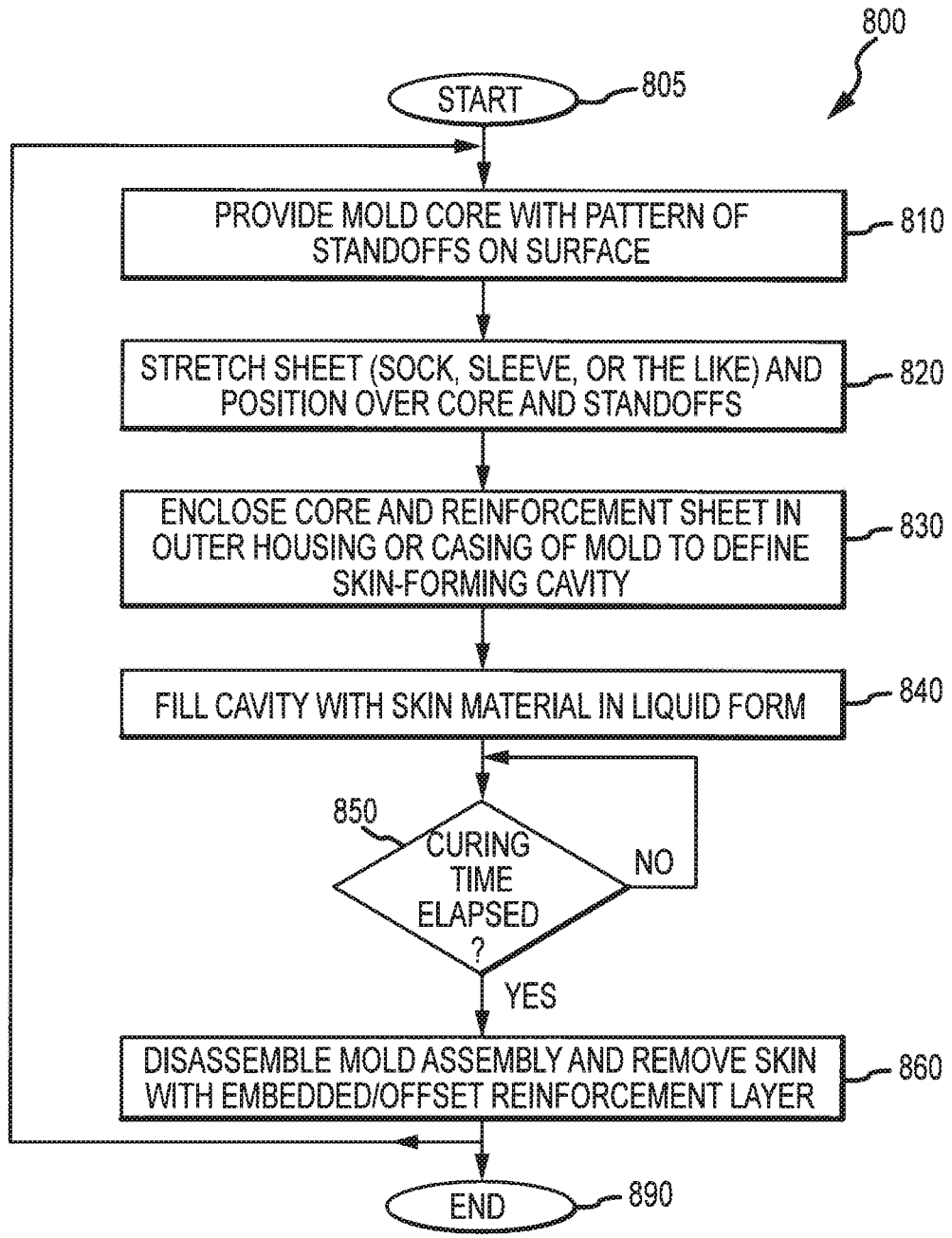
FIG. 8 is a flow diagram for a process or method of fabricating a skin with an offset or embedded reinforcement layer.

FIG. 8 illustrates a method 800 of fabricating a skin or skin system according to an embodiment of the invention. As shown, the method 800 starts at 805 such as with designing a mold assembly for use in molding a skin such as a skin to cover all or a portion of a robotic assembly or for other uses such as a diving/wet suit or other athletic applications. At step 810, a mold core is provided for use in forming the skin designed/selected in step 805. The mold core includes at least one pattern or plurality/set of standoffs on its exterior surface (cavity-facing surface). In some embodiments, more than one region or portion of the mold will have a set of standoffs, and the different sets of standoffs may have similarly designed/configured standoffs (same shape, same height, same spacing and size, and so on) or may be different in standoff design. Further, the standoffs may be varied in shape, size, or other parameters within a single standoff pattern/set in some cases to achieve different offset distances for a single sheet or other desired effect in the skin.

At step 820, the method 800 continues with providing a sheet, sock, sleeve, or the like of reinforcement material and then stretching and positioning the reinforcement material over the core and its included standoffs. At 830, the core with the attached reinforcement sheet/layer is enclosed in a casing or outer housing such that a skin-forming cavity is defined between the core surface with the standoffs and the casing's inner surface. The reinforcement sheet/layer is positioned within the cavity at an offset distance (depth) from the core surface.

At step 840, the method 800 continues with filling the cavity with skin material such as a rubber in liquid form (performing a pour in the assembled mold). The skin material may be pumped into the cavity at some predefined pressure such that it readily flows through and fills the cavity including flowing between the offsets/standoffs on the core surface and through the openings/gaps in the mesh or fabric of the reinforcement sheet, sleeve, sock, or the like. At 850, the method 800 involves determining if a preset time (curing time) has passed in which the poured/pumped material has adequately hardened to allow its removal from the mold. If not, the mold is retained in its assembled arrangement, and the step 850 is repeated until the hardening of the skin is complete.

At 860, the method 800 continues with disassembling the mold assembly and removing the skin. The skin differs from prior skins in that the skin includes a reinforcement sheet/layer (or sheets/layers) that are embedded within the skin and not merely on an exposed surface. Instead, the reinforcement material (mesh spandex or the like) is bonded to the skin material at an offset distance established by the offsets, and the skin is detached from the core including the surface or surfaces with the offsets/standoffs. The method 800 may continue with forming additional skins or may end at step 890.

Note, in some embodiments of method 800, the skin is not formed with a single pour. In such cases, the method 800 would be repeated beginning at 810 with use of a different casing so that another outer layer may be applied over the originally poured/formed skin with the reinforcement sheet. Two to four or more pours may be performed to provide a multi-layer skin in which, typically, each layer of the skin will have differing characteristics (e.g., differing hardness or the like).

After step 890, the skin produced by method 800 may be used in an application such as by placing it over a robotic device with the more durable portions of the skin with the reinforcement material/sheets strategically provided in areas of greater wear such as contacting drivers moving the skin (e.g., portions of a robotic head or hands that move repeatedly in use).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The methods taught herein produce or provide a flexible skin such as may be used to cover/encase a robot that lasts longer and is also lighter in weight.

To this end, the method involves providing a predetermined series or pattern of raised shapes (offsets or standoffs) on the outer surface of the core. This enables the skin manufacturer to choose an area to reinforce and a depth at which it is desired to place the reinforcement layer within the thickness of the skin (in the body/sheet of skin what offset distance is used for the mesh/porous reinforcement). In addition to allowing selectable depths for the reinforcement, the skin surface is textured by the offsets/standoffs which makes this makes the skin lighter overall and also makes the skin more flexible at the area/location of the reinforcement such as where robotic drives have to bend or twist the skin (e.g., the back of the neck, an elbow or other joint, and so on). This allows less force to be applied to provide the same amount of skin movement when compared to a non-textured or solid skin, with this advantage potentially provided by less contact surface area so less stiction between the mechanism and the robotic skin. The method described herein may be one of the first processes making it possible for skin manufacturers to readily select the depth at which the reinforcement material/layer sits within the skin, with at least some offset amount (e.g., at least 1/16 inch or the like) being desirable such that the reinforcement material is not on the back of or exposed on a surface (inner surface in many cases) of the skin.

I claim:

1. A method for fabricating an artificial skin, comprising:
providing a mold assembly with an exterior mold and an interior core, a cavity between inner surfaces of the exterior mold and exterior surfaces of the interior core defining a shape of a skin, wherein a surface of the interior core facing the cavity includes a plurality of offsets extending outward a distance from the interior core surface;
positioning a sheet of reinforcement material over the interior core surface, wherein the sheet is in abutting contact with at least a portion of the offsets;
pouring material for the skin into the mold assembly to occupy the cavity between the exterior mold and the interior core; and
after the material has hardened to form the skin, disassembling the mold assembly and removing the skin with the sheet of reinforcement material embedded within the skin at an offset distance from a surface of the skin,
wherein the reinforcement material comprises a mesh fabric of an elastic material and
wherein the positioning of the sheet of the reinforcement material over the interior core surface comprises first stretching the mesh fabric of the elastic material over the interior core surface such that the at least a portion of the offsets each extends a distance through a hole in the mesh fabric of the elastic material and second releasing the mesh fabric of the elastic material to be retained in place in the cavity by the abutting contact with the at least a portion of the offsets.

2. The method of claim 1, wherein the elastic material comprises spandex.

3. The method of claim 1, wherein the offsets retain the sheet of reinforcement material at the offset distance, the offset distance being at least about 1/16 inches from the surface of the skin.

4. The method of claim 1, wherein each of the offsets has a body with a conical, frustoconical, or hemispherical shape.

5. The method of claim 4, wherein each of the bodies further includes at least one retention member for coupling with threads of the sheet of reinforcement material.

6. The method of claim 5, wherein the retention member is provided at a distance from a tip of the body of the offset, wherein the body increases in diameter from the tip to a base proximate to the interior core surface, and wherein the retention member comprises a recessed surface extending about the body of the offset adapted for receiving one or more of the threads of the sheet of the reinforcement material.

7. A method for fabricating a skin, comprising:
providing a core for a mold, wherein a surface of the core includes a pattern of standoffs extending outward from the core surface;
positioning a piece of reinforcement material over the surface to be in contact with the standoffs;
pouring material for a skin over the core and the piece of reinforcement material; and
after the material has hardened, removing the skin with the piece of reinforcement material embedded within the skin at an offset distance from a surface of the skin,
wherein the reinforcement material comprises a mesh fabric of an elastic material,
wherein the positioning comprises stretching the piece of reinforcement material to expand the mesh fabric from a first configuration to a second configuration larger in at least one dimension than the first configuration,
wherein each of the standoffs comprises a body with a base proximate to the surface of the core and a tip distal to the surface of the core that is smaller in diameter than the base, and
wherein, after the positioning, the mesh fabric of the elastic material mates with each of the bodies of the standoffs contacting the piece of reinforcement material at a location between the base and the tip.

8. The method of claim 7, wherein the elastic material comprises spandex and wherein the standoffs retain the sheet of reinforcement material at the offset distance, the offset distance being at least about 1/16 inches from the surface of the skin.

9. The method of claim 7, wherein the body of each of the standoffs has a conical, frustoconical, or hemispherical shape.

10. The method of claim 9, wherein each of the bodies further includes at least one retention member for coupling with threads of the sheet of reinforcement material.

11. The method of claim 10, wherein the retention member is provided at a distance from a tip of the body of the offset and comprises a recessed surface extending about the body of the offset adapted for receiving one or more of the threads of the piece of the reinforcement material.

12. A method for fabricating an artificial skin, comprising:
providing a mold assembly with an exterior mold and an interior core, a cavity between inner surfaces of the exterior mold and exterior surfaces of the interior core defining a shape of a skin, wherein a surface of the interior core facing the cavity includes a plurality of offsets extending outward a distance from the interior core surface;
positioning a sheet of reinforcement material, that is formed of an elastic porous material with holes and is shaped as a sleeve, over the interior core surface, wherein the positioning comprises stretching the sheet of reinforcement material such that the holes are larger in diameter than diameters of tips of the offsets and wherein, after the positioning, a plurality of the tips of the offsets extend through the holes; and
pouring material for the skin into the mold assembly to occupy the cavity between the exterior mold and the interior core.

13. The method of claim 12, wherein each of the offsets extends from a base proximate to the interior core surface to the tip at an angle in the range of 3 to 30 degrees.

14. The method of claim 12, wherein each of the offsets has a body with a conical, a frustoconical, or hemispherical shape.

15. The method of claim 14, wherein each of the bodies comprise two or more recessed surfaces that are spaced apart from each other and extend about the body of the offset adapted for receiving one or more of the sheet of the reinforcement material.

16. The method of claim 12, wherein at least a subset of the offsets has a height matching or exceeding a thickness of the cavity such that the skin is porous.

17. The method of claim 12, wherein the offsets comprise a first set of the offsets with a first height and a second set of the offsets with a second height greater than the first height, whereby the sheet of reinforcement material is retained at two offset depths in the skin.

18. The method of claim 12, wherein the offsets are arranged in parallel rows with the offsets of adjacent pairs being offset from each other along a length of the row.

19. The method of claim 12, wherein the sleeve has a diameter less than a diameter of the interior core when in an at rest configuration.

20. The method of claim 12, wherein the reinforcement material comprises spandex.

* * * * *